Patented Nov. 26, 1940

2,222,775

UNITED STATES PATENT OFFICE 2,222,775

AZO DYESTUFFS INSOLUBLE IN WATER

Wilhelm Kunze, Frankfort-on-the-Main-Fechenheim, Germany, assignor to General Aniline & Film Corporation, a corporation of Delaware No Drawing. Application September 22, 1938, Serial No. 231,161. In Germany October 2, 1937

4 Claims. (Cl. 260—205)

This invention relates to water-insoluble azo-dyestuffs, more particularly to those of the general formula:

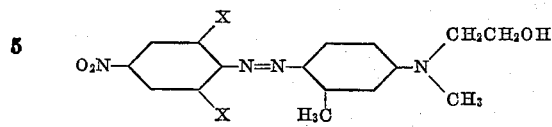

wherein X stands for a member selected from the group consisting of hydrogen and halogen.

The new dyestuffs may be prepared by combining diazo compounds of 4-nitro-1-aminobenzene and its halogen substitution products with 1-(N-oxethyl-methylamino)-3-methylbenzene. They are especially valuable for the dyeing and printing of cellulose esters and ethers, and they are distinguished by very good fastness properties and by a good productiveness. The known azo-dyestuffs which possess a similar constitution are surpassed by the new products by better fastness to light or by better productiveness and better tinctorial power.

In order to further illustrate my invention the following examples are given the part being by weight and all temperatures in degrees centigrade.

Example 1

175 parts of 4-nitro-2-chloro-1-aminobenzene are diazotized in the usual manner and the diazo solution obtained is combined while cooling with an aqueous solution of 175 parts of 1-(N-oxethyl-methylamino)-3-methylbenzene containing an excess of hydrochloric acid. By the addition of sodium acetate the free mineral acid is neutralized and then the dyestuff formed of the formula:

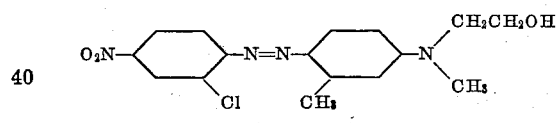

is filtered off, washed, and dried. It dyes acetate artificial silk, when employed in admixture with a suitable dispersing agent, bright ruby-red shades. The dyeings thus obtained are distinguished by a very good fastness to light, washing and perspiration.

The new dyestuff has a better productiveness than the analogous known dyestuff prepared by combining the above diazo compound with 1-(N-oxethyl-ethylamino)-3-methylbenzene as coupling component.

By employing instead of the above diazo component the corresponding amount of 4-nitro-1-aminobenzene, a dyestuff is obtained of the formula:

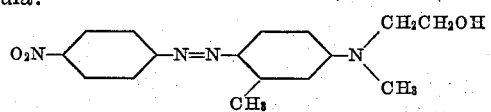

which dyes acetate artificial silk bright bluish red shades of very good fastness properties.

Example 2

207 parts of 2,6-dichloro-4-nitro-1-aminobenzene are introduced into 420 parts of nitrosylsulfuric acid of 33% strength and then the mixture is diluted by the addition of ice. The diazo solution thus obtained is filtered and then allowed to run into an aqueous solution of 175 parts of 1-(N-oxethyl-methylamino)-3-methylbenzene containing hydrochloric acid. When the combination is complete, the solution is neutralized by means of sodium acetate and the dyestuff formed of the formula:

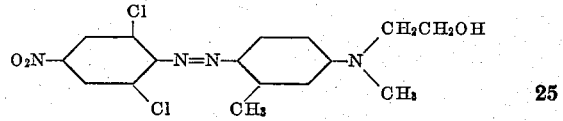

is filtered off, washed and dried. It dyes acetate artificial silk, when employed in admixture with a suitable dispersing agent, reddish brown shades of very good fastness to light and good fastness to water, washing and perspiration.

The analogous known azodyestuff prepared by combining the above diazo compound with 1-(N,-N-dioxethyl-amino)-3-methylbenzene as coupling component is surpassed by the present new dyestuff by a considerably better productiveness.

I claim:

1. Azodyestuffs insoluble in water of the general formula:

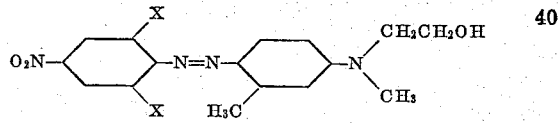

wherein X stands for a member selected from the group consisting of hydrogen and halogen, which dyestuffs dye cellulose esters and ethers, when employed in admixture with a dispersing agent, various shades of very good fastness properties.

2. The azodyestuff of the formula:

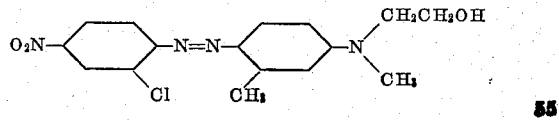

which dyestuff dyes acetate artificial silk bright ruby-red shades of very good fastness to light, washing and perspiration.

3. The azodyestuff of the formula:

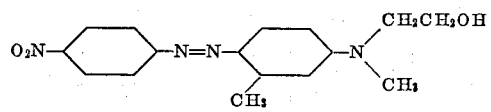

which dyestuff dyes acetate artificial silk bright bluish red shades of very good fastness properties.

4. The azodyestuff of the formula:

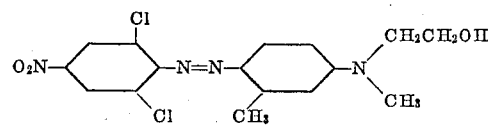

which dyestuff dyes acetate artificial silk reddish brown shades of very good fastness to light and good fastness to water, washing and perspiration.

WILHELM KUNZE.